Figure 1:
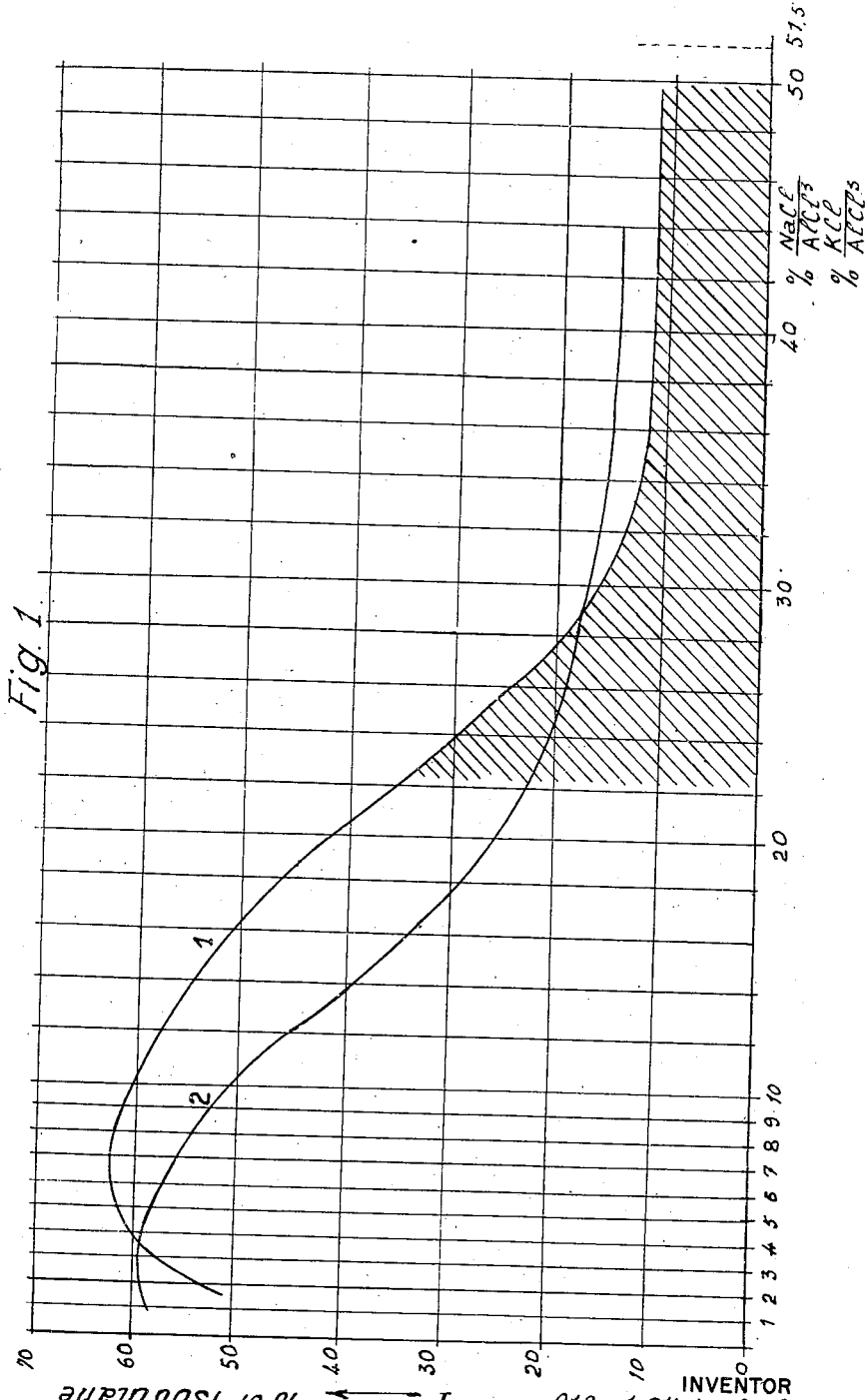

Sept. 20, 1949.    J. A. O. ANTHEAUME    2,482,145
METHOD FOR ISOMERIZATION
Filed July 12, 1946    3 Sheets-Sheet 2

INVENTOR
Jacques Alfred Olivier Antheaume
BY
Blair, Curtis + Hayward
ATTORNEYS

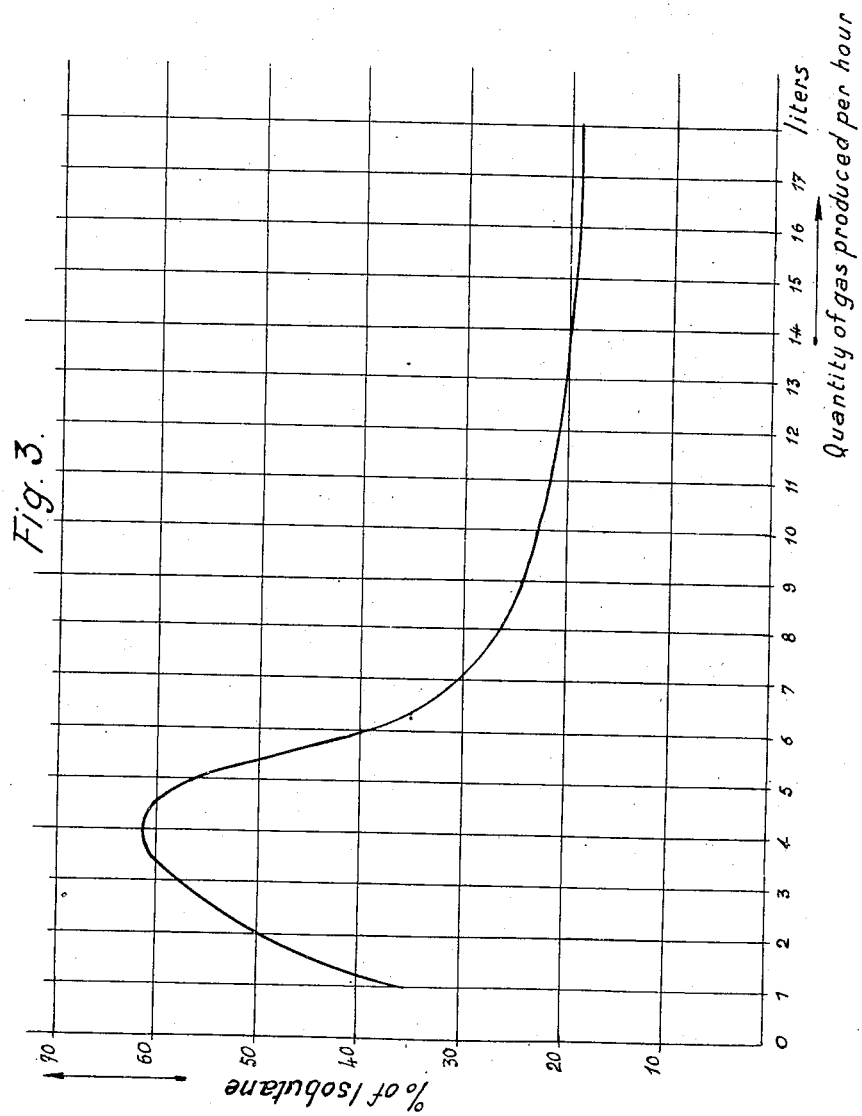

Patented Sept. 20, 1949

2,482,145

UNITED STATES PATENT OFFICE 2,482,145

METHOD FOR ISOMERIZATION

Jacques Alfred Olivier Antheaume, Saint-Gaudens, France, assignor to Compagnie Francaise de Raffinage, Paris, France Application July 12, 1946, Serial No. 683,050
In France July 17, 1945

5 Claims. (Cl. 260—683.5)

In the prior French Patent 876,193 filed by the Standard Oil Development Company, there is described a method for isomerizing butane, which consists in submitting normal butane to the action of a catalyst of the Friedel and Crafts type modified by a halide of an alkaline metal, such as a mixture of NaCl with AlCl$_3$. Said patent discloses that the proportion of the two types of halides in the double salts exerts a considerable influence on the activity of the mixture. The best proportion to be adopted between the two reagents is stated to be comprised between about 1.1 and 2.5 mols of aluminium chloride for each mol of sodium chloride. Preferably also, as disclosed in said prior patent, NaCl should be used rather than potassium salts or salts of the other metals of the alkaline group, not only by reason of its low price but because it is stated to be superior to the other alkaline halides. Lastly the transformation temperature of normal butane as disclosed in this French patent should be comprised between 65° C. and 107° C. In the examples of the patent the operation is executed under pressures comprised between 28 and 70 atmospheres.

Now, applicant has discovered that improved yields of isobutane can be obtained by utilizing catalyst compositions and operating conditions significantly different from those disclosed by the French patentee.

In the first place, I have found that in contradistinction with the data furnished by said patent, potassium chloride gives results which under the conditions described below are better than those obtained with sodium chloride.

In the second place I have found that if it is desired to obtain an efficiency which is interesting for commercial purposes it is necessary to depart from the limits disclosed by the above mentioned French patent for the composition of the mixture of the catalyst of the Friedel and Crafts type with the halide of the alkaline metal.

I will disclose hereinafter, by way of example, the results obtained by using increasing contents of potassium chloride in aluminium chloride, and operating with a volume of catalyst equal to 160 cubic centimeters and an output of 4 liters of butane per hour, at a temperature of 145° C. The catalyst used was activated vegetable carbon dried at 25° C. under a vacuum of 15 mms. during one hour; this carbon was placed inside a capsule containing aluminium chloride dissolved in potassium chloride; the carbon absorbs very rapidly the liquid.

Under such conditions, the following results have been obtained. The quantity of alkaline halide in the following tables, as well as in other portions of the specification and in the drawings, is expressed as percentage by weight of the alkaline halide in the halide mixture.

Table I

| $\frac{KCl}{AlCl_3}$ | C$_3$ Fraction | Isobutane | N Butane |
|---|---|---|---|
| Percent | | | |
| 2 | 0 | 53 | 47 |
| 4 | 13.4 | 61.2 | 25.4 |
| 6 | 4.5 | 62.7 | 32.8 |
| 9 | 7.19 | 61.88 | 30.93 |
| 19 | 7.5 | 47.3 | 45.2 |
| 25 | 0 | 24.4 | 75.6 |
| 30 | 0 | 15 | 85 |
| 35.5 | 2 | 11.6 | 86.4 |
| 51.5 | 0.6 | 13.1 | 86.3 |

Similarly by replacing potassium chloride by sodium chloride I have obtained the following results:

Table II

| $\frac{NaCl}{AlCl_3}$ | C$_3$ Fraction | Isobutane | N Butane |
|---|---|---|---|
| Percent | | | |
| 2 | 1.5 | 60 | 38.5 |
| 2 | 10.4 | 62 | 27.5 |
| 5 | 6.8 | 54.3 | 38.9 |
| 5 | 8.2 | 59.3 | 32.5 |
| 10 | 10.7 | 51.6 | 37.7 |
| 20 | 1.8 | 22.5 | 75.7 |
| 30 | 0 | 15.2 | 84.8 |
| 40 | 0 | 17.7 | 82.3 |

In accompanying drawing, Fig. 1 shows the curve 1 corresponding to the Table I, i. e. to the results obtained with potassium chloride and the curve 2 corresponding to the Table II, i. e. to the results obtained with sodium chloride. In the establishment of these curves, I have disclosed as in abscissae the percentages of $$\frac{KCl}{AlCl_3}$$

or $$\frac{NaCl}{AlCl_3}$$

and as ordinates the percentage of isobutane obtained in each case. It is immediately apparent that the best results are obtained far outside the range claimed by the prior above mentioned Patent 876,193 which range has been shown by hatched lines on the drawing.

Figure 2:
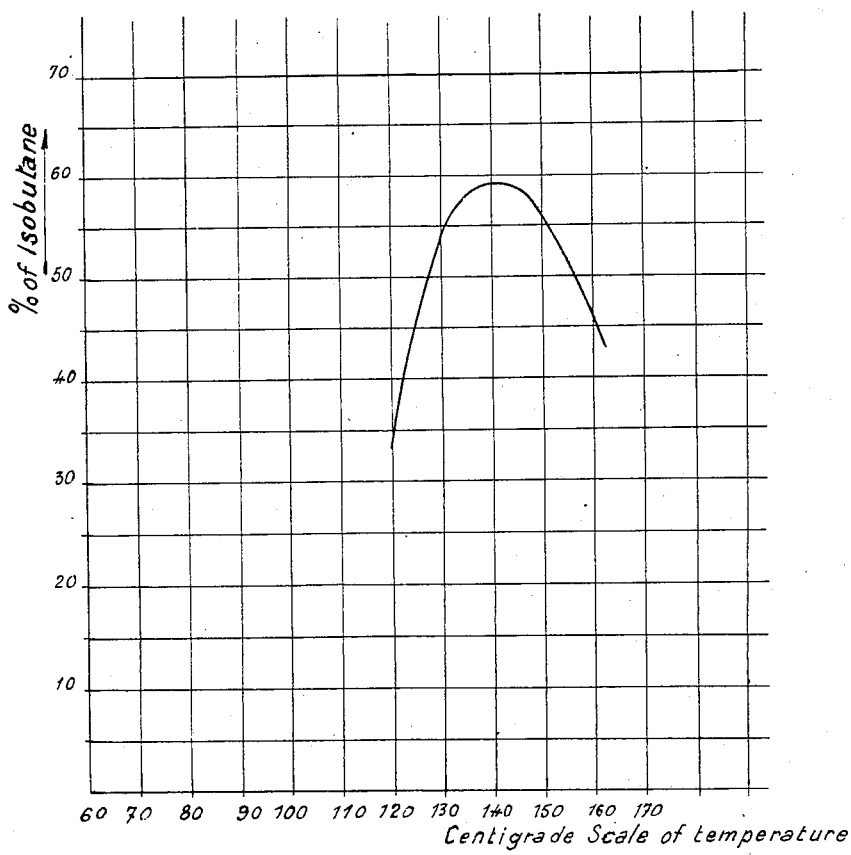

In the third place, I have found that as concerns temperature, it is desirable to operate in the vicinity of 140° C. and in practice in the range between 130° and 150° C. if it is desired to obtain the optimum efficiency, as disclosed in Fig. 2 which has been drawn in accordance with the following results of the experiments.

Table III

| Temperature of experiment | Propane | Isobutane | N butane |
|---|---|---|---|
| °C. | | | |
| 120 | 0 | 33.2 | 66.8 |
| 130 | 6.66 | 53.88 | 39.46 |
| 140 | 12 | 59.33 | 28.67 |
| 150 | 13.7 | 56 | 30.3 |
| 160 | 20.5 | 46.4 | 33.1 |

In the fourth place, applicant has found that the flow rates have a considerable effect as illustrated in Fig. 3. It is apparent that the optimum efficiency is obtained with an hourly output of 4 liters of gas for 160 cubic centimeters of catalyst, the operation being carried out under the optimum conditions disclosed hereinabove.

The application of pressure for obtaining commercial efficiencies is not indispensable and it is possible to operate at atmospheric pressure.

What I claim is:

1. A method for isomerizing normal butane which comprises carrying out the isomerization reaction in the presence of a catalyst consisting of a binary mixture of aluminum chloride and an alkali metal chloride containing at least 90% by weight of aluminum chloride.

2. A method for isomerizing normal butane which comprises carrying out the isomerization reaction in the presence of a catalyst consisting of a binary mixture of aluminum chloride and an alkali metal chloride containing at least 90% by weight of aluminum chloride, and maintaining the reaction temperature above 107° C. to produce a relatively high yield of the isomerized product.

3. A method for isomerizing normal butane which comprises carrying out the isomerization reaction in the presence of a catalyst consisting of a binary mixture of aluminum chloride and an alkali metal chloride containing at least 90% by weight of aluminum chloride, and maintaining the temperature of the reaction between about 130° C. and 150° C. to produce a relatively high yield of the isomerized product.

4. A method for isomerizing normal butane which comprises carrying out the isomerization reaction in the presence of a catalyst consisting of a binary mixture of aluminum chloride and an alkali metal chloride containing at least 90% by weight of aluminum chloride, and causing the normal butane in vapor form to flow over the catalyst at such a rate that the volume of gas flowing over the catalyst per hour is about 25 times the volume of the catalyst.

5. A method for isomerizing normal butane which comprises carrying out the isomerization reaction in the presence of a catalyst consisting of a binary mixture of aluminum chloride and potassium chloride containing at least 90% by weight of aluminum chloride, maintaining the reaction temperature above 107° C., and passing the normal butane in vapor form over the catalyst at such a rate that the volume of gas coming in contact with the catalyst per hour is about 25 times the volume of the catalyst.

JACQUES ALFRED OLIVIER ANTHEAUME.

REFERENCES CITED

The following references are of record in the file of this patent:

UNITED STATES PATENTS

| Number | Name | Date |
|---|---|---|
| 2,271,299 | Ipatieff et al. | Jan. 27, 1942 |
| 2,342,073 | Cheney | Feb. 15, 1944 |
| 2,353,899 | Ipatieff et al. | July 18, 1944 |
| 2,413,691 | Crawford et al. | Jan. 7, 1947 |